United States Patent [19]

Sugiyama

[11] Patent Number: 5,862,412
[45] Date of Patent: Jan. 19, 1999

[54] APPARATUS FOR CONVERTING DOCUMENT DATA INTO BIT MAP DATA AND COMPRESSING DISPLAY IMAGE FORMED BY COMBINING THE BIT MAP DATA AND IMAGE DATA

[75] Inventor: Mikio Sugiyama, Tokyo, Japan

[73] Assignee: NEC Corporation, Tokyo, Japan

[21] Appl. No.: 588,314

[22] Filed: Jan. 18, 1996

[30] Foreign Application Priority Data

Jan. 20, 1995 [JP] Japan ........................... 7-026097

[51] Int. Cl.⁶ .......................................... G06F 13/00
[52] U.S. Cl. .......................... 395/888; 395/885; 395/890
[58] Field of Search ................................. 345/202, 418; 347/132; 348/239, 231, 418; 358/426; 382/131, 272; 395/117, 439, 101, 806; 707/511; 359/115

[56] References Cited

U.S. PATENT DOCUMENTS

| H1589 | 9/1996 | Rosenthal | 364/420 |
|---|---|---|---|
| 3,781,816 | 12/1973 | Coleman et al. | 395/101 |
| 4,125,873 | 11/1978 | Chesarek | 345/202 |
| 4,668,995 | 5/1987 | Chen et al. | 382/272 |
| 4,682,190 | 7/1987 | Ikeda | 347/132 |
| 4,807,182 | 2/1989 | Queen | 707/511 |
| 5,293,313 | 3/1994 | Cecil et al. | 382/131 |
| 5,325,126 | 6/1994 | Keith | 348/418 |
| 5,353,388 | 10/1994 | Motoyama | 395/117 |
| 5,394,534 | 2/1995 | Kulakowski et al. | 395/439 |
| 5,539,842 | 7/1996 | Schwartz | 382/232 |
| 5,566,001 | 10/1996 | Saidi et al. | 358/426 |
| 5,621,459 | 4/1997 | Ueda et al. | 348/239 |
| 5,635,982 | 6/1997 | Zhang et al. | 348/231 |
| 5,638,498 | 6/1997 | Tyler et al. | 395/117 |
| 5,664,029 | 9/1997 | Callahan et al. | 382/260 |
| 5,664,070 | 9/1997 | Egawa et al. | 395/102 |
| 5,666,211 | 9/1997 | Tahara et al. | 358/404 |
| 5,777,617 | 7/1998 | Kishimoto | 345/418 |

FOREIGN PATENT DOCUMENTS

| 64-10387 | 1/1989 | Japan . |
|---|---|---|
| 2-205982 | 8/1990 | Japan . |

*Primary Examiner*—Thomas C. Lee
*Assistant Examiner*—Michael G. Smith
*Attorney, Agent, or Firm*—Sughrue, Mion, Zinn, Macpeak & Seas, PLLC

[57] ABSTRACT

The invention provides a character and picture data compression apparatus which can collectively compress document data of the character code form and still picture data and moving picture data of the bit map form. A conversion section converts document data of the character code form into those of the bit map form. A display image composition section composes the document data of the bit map form, still picture data of the bit map form and a first one frame of moving picture data into a display image of the first page, and then produces, for each of the succeeding frames, a display image wherein the moving picture data portion in the display image of the first page is replaced with moving picture data of the frame. A difference processing section calculates, for each of the display images of the succeeding pages, a difference from the display image of the immediately preceding page in the bit map form. A bit map data compression section successively receives the display image of the first page and the display images of the succeeding pages obtained by the difference processing section and performs compression of the images in units of one page.

5 Claims, 7 Drawing Sheets

APPARATUS FOR CONVERTING DOCUMENT DATA INTO BIT MAP DATA AND COMPRESSING DISPLAY IMAGE FORMED BY COMBINING THE BIT MAP DATA AND IMAGE DATA

BACKGROUND OF THE INVENTION

1. Field of the Invention

This invention relates to a character and picture data compression apparatus which collectively compresses document data of the character code form and still picture data and moving picture data of the bit map form of binary or multiple values.

2. Description of the Related Art

Much effort has been and is being directed to development of a portable terminal equipment wherein character data and/or picture data of binary or multiple values of characters, line drawings, photographs and so forth recorded in a book, a newspaper, a magazine or the like are recorded onto an electronic, optical or magnetic recording medium. Thus, allowing the recorded data to be read out and developed into a display image so that it may be displayed on a display apparatus such as a liquid crystal display apparatus, or an equipment wherein a display image developed in such a manner as described above is displayed on a display apparatus such as a CRT (cathode ray tube) apparatus. Meanwhile, as a result of development of multi-media in recent years, recording data often include, in addition to character data and still picture data, moving picture data of binary or multiple values called simplified animation.

Figure 6:
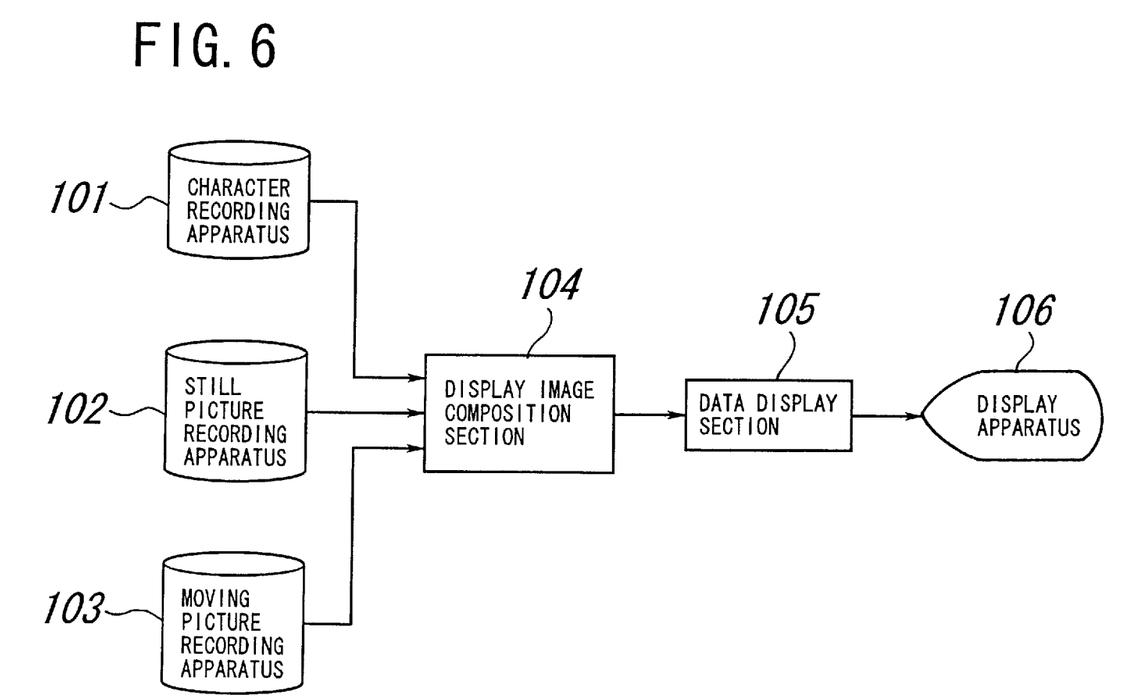
FIGS. 6 and 7 are block diagrams showing conventional exemplary constructions of a system which displays a display image including characters, a still picture and a moving picture.

FIG. 6 shows a system construction by which a display image in which characters, a still picture and a moving picture are included in a mixed condition which is displayed. Referring to FIG. 6, document data wherein characters and so forth are represented in character codes of 2 bytes are recorded in a character recording apparatus 101, and still picture data and moving picture data of the bit map form are recorded in a still picture recording apparatus 102 and a moving picture recording apparatus 103, respectively. When the data are to be displayed, a display image composition section 104 reads out the document data from the character recording apparatus 101 and passes them on to a data display section 105 so that the document is displayed in a document displaying area of a screen of a display apparatus 106. Simultaneously, the display image composition section 104 reads out the still picture data of the bit map form from the still picture recording apparatus 102 and passes them on to the data display section 105 so that the still picture is displayed in a still picture displaying area of the screen of the display apparatus 106. Further, the display image composition section 104 reads out the moving picture data of the bit map form of the first page from the moving picture recording apparatus 103 and passes them on to the data display section 105 so that the moving picture data are displayed in a moving picture displaying area of the screen of the display apparatus 106. Similarly, the display image composition section 104 successively reads out the moving picture data of the bit map form of the second and succeeding pages at predetermined time intervals and passes them on to the data display section 105 so that the moving picture display area of the screen of the display apparatus 106 is successively updated with the moving picture data.

In the system construction described above, where a recording medium having a comparatively small recording capacity such as a floppy disk is used for any of the recording apparatus 101 to 103, or even if a recording medium having a sufficiently large recording capacity is employed, where a large amount of still picture data or moving picture data is to be stored, care must be taken regarding the shortage of the recording capacity of the recording apparatus.

Figure 7:
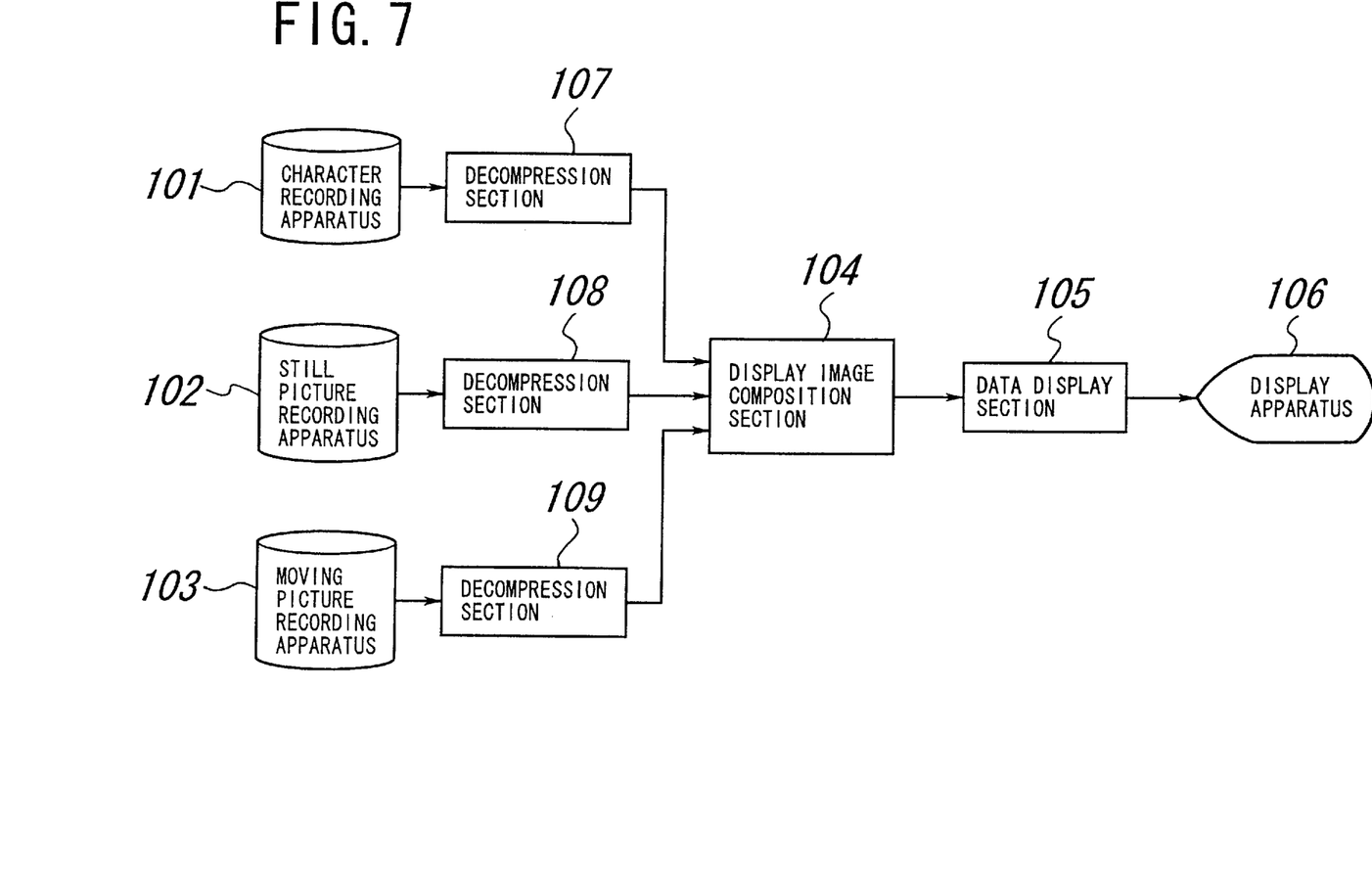

FIG. 7 shows another system construction which solves the problem just described. Referring to FIG. 7, the system shown includes three decompression sections 107, 108 and 109 in addition to similar components to those of the system described above with reference to FIG. 6. In the present system, document data compressed using a known data compression technique are recorded into the character recording apparatus 101 whereas data of a still picture and a moving picture of the bit map form compressed using a known data compression technique are recorded also into the still picture recording apparatus 102 and the moving picture recording apparatus 103, respectively. Then, when the data are to be displayed, the data are decompressed by the decompression sections 107, 108 and 109 and then passed on via the display image composition section 104 to the data display section 105 so that they are displayed in the individual displaying areas of the screen of the display apparatus 106.

With the construction of the system of FIG. 7, since a document, a still picture and a moving picture are recorded in individually compressed conditions, the capacity required for each recording apparatus is small compared to that of the system of FIG. 6. The data compression techniques for a document, a still picture and a moving picture have exhibited remarkable progresses in recent years, and data compression techniques having a high compression efficiency have been proposed. Thus, use of any of the techniques would allow further reduction in storage capacity.

For example, Japanese Patent Laid-Open Application No. Heisei 2-205982 discloses a technique wherein a nature of a picture of an object of compression is identified based on a statistical distribution of the compression object picture, and an optimum one of a plurality of data compression algorithms prepared in advance is selectively used based on a result of the identification to compress data. This technique can be utilized for compression of still picture data.

Meanwhile, Japanese Patent Laid-Open Application No. Showa 64-10387 discloses another technique wherein a moving picture is represented in difference data between frames and the data are represented in two kinds of binary data to perform compression processing such as run-length compression which is used for compression of ordinary frame data. This technique can be utilized for compression of moving picture data. Further, various methods have been proposed for the compression technique of character codes, such as a method which employs a combination of several coding methods. Those techniques can be utilized for compression of document data. Naturally, also such a high efficiency coding technique as the MPEG or the JPEG can be applied to compression of moving picture data.

In this manner, the approaches to reduction in storage capacity in systems which display a display image in which a still picture and a moving picture are included in a mixed condition have been principally directed to an effort to raise the compression efficiency of document data themselves, a still picture itself or a moving picture itself. Consequently, although the compression efficiency exhibits some improvement, since the document data, still picture and moving picture are compressed independently of each other, another problem is invited that a large scale is required for a compression apparatus used for compression of those data.

Particularly, with such a system which selectively uses a plurality of data compression algorithms, as disclosed in Japanese Patent Laid-Open Application No. Heisei 2-205982 mentioned hereinabove, or another system which compresses character codes using a combination of several coding methods, the problem of increase in scale of the compression apparatus is even more significant.

SUMMARY OF THE INVENTION

It is an object of the present invention to provide a character and picture data compression apparatus which can collectively compress data of various types including document data of the character code form and still picture data and moving picture data of the bit map form.

In order to attain the object described above, according to an aspect of the present invention, there is provided a character and picture data compression apparatus for collectively compressing document data of a character code form and picture data of a bit map form, which comprises conversion means for converting the document data into document data of the bit map form, display image composition means for composing the document data of the bit map form from the conversion means and the picture data of the bit map form into a display image, and data compression means for compressing the display image of the bit map form produced by the display image composition means.

In the character and picture data compression apparatus, the conversion means converts the form of document data from the character code form to the bit map form, and the display image composition means composes the document data of the bit map form from the conversion means and picture data of the bit map form into a display image. The display image is compressed by the data compression means. Consequently, with the character and picture data compression apparatus, it is required to perform data compression only for data of the bit map form. Accordingly, no complicated processing is required and the compression apparatus can be produced with a comparatively small scale.

According to another aspect of the present invention, there is provided a character and picture data compression apparatus for collectively compressing document data of a character code form and picture data of a bit map form, which comprises conversion means for converting the document data into document data of the bit map form, display image composition means for composing the document data of the bit map form from the conversion means and the picture data of the bit map form into a display image, difference processing means for calculating a difference between a plurality of display images of the bit map form produced by the display image composition means, and data compression means for compressing the display image from the difference processing means.

In the character and picture data compression apparatus, the conversion means converts the form of document data from the character code form to the bit map form, and the display image composition means composes the document data of the bit map form from the conversion means and the picture data of the bit map form into a display image. The difference processing means calculates a difference between a plurality of display images of the bit map form produced by the display image composition means, and the data compression means compresses the display image from the difference processing means. Consequently, with the character and picture data compression apparatus, it is required to perform data compression only for data of the bit map form. Accordingly, no complicated processing is required and the compression apparatus can be produced with a comparatively small scale. Further, since compression is performed after difference calculation processing, efficient coding can be achieved and a high compression ratio can be obtained.

According to a further aspect of the present invention, there is provided a character and picture data compression apparatus for collectively compressing document data of a character code form, still picture data of a bit map form and moving picture data of the bit map form for a plurality of frames, which comprises conversion means for converting the document data into document data of the bit map form, display image composition means for composing the document data of the bit map form from the conversion means, the still picture data of the bit map form and the moving picture data of the bit map form into display images for a plurality of pages, difference processing means for calculating, for each of the display images of second and following pages produced by the display image composition means, a difference of the bit map form of the display image from an immediately preceding display image, and data compression means for successively receiving the display image of a first page produced by the display image composition means and the difference display images of the second and following pages obtained by the different processing means and compressing the data of the images in units of one page.

Preferably, the difference processing means calculates each of the difference display images by logical exclusive ORing of same picture elements of the current page and the immediately preceding page.

In the character and picture data compression apparatus, the conversion means converts the form of document data from the character code form to the bit map form, and the display image composition means composes the document data of the bit map form from the conversion means, the still picture data of the bit map form and the moving picture data of the bit map form into display images for a plurality of pages. Then, the difference processing means calculates, for each of the display images of second and following pages produced by the display image composition means, a difference of the bit map form of the display image from an immediately preceding display image, and the data compression means successively compresses the display image of a first page produced by the display image composition means and the difference display images of the second and following pages obtained by the different processing means. Consequently, with the character and picture data compression apparatus, it is required to perform data compression only for data of the bit map form. Accordingly, no complicated processing is required and the compression apparatus can be produced with a comparatively small scale. Further, since compression is performed after difference calculation processing, efficient coding can be achieved and a high compression ratio can be obtained.

Further, when data compressed by any of the character and picture data compression apparatus of the present invention described above and recorded into a recording apparatus are applied to a system which records and/or displays characters, a still picture and a moving picture in a mixed condition, the capacity required for the recording apparatus can be reduced, and besides, the characters, the still picture and the moving picture need not be decompressed independently of each other. Furthermore, since the processing for composing the characters, the still picture and the moving picture into a display image is eliminated, high speed displaying can be achieved.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
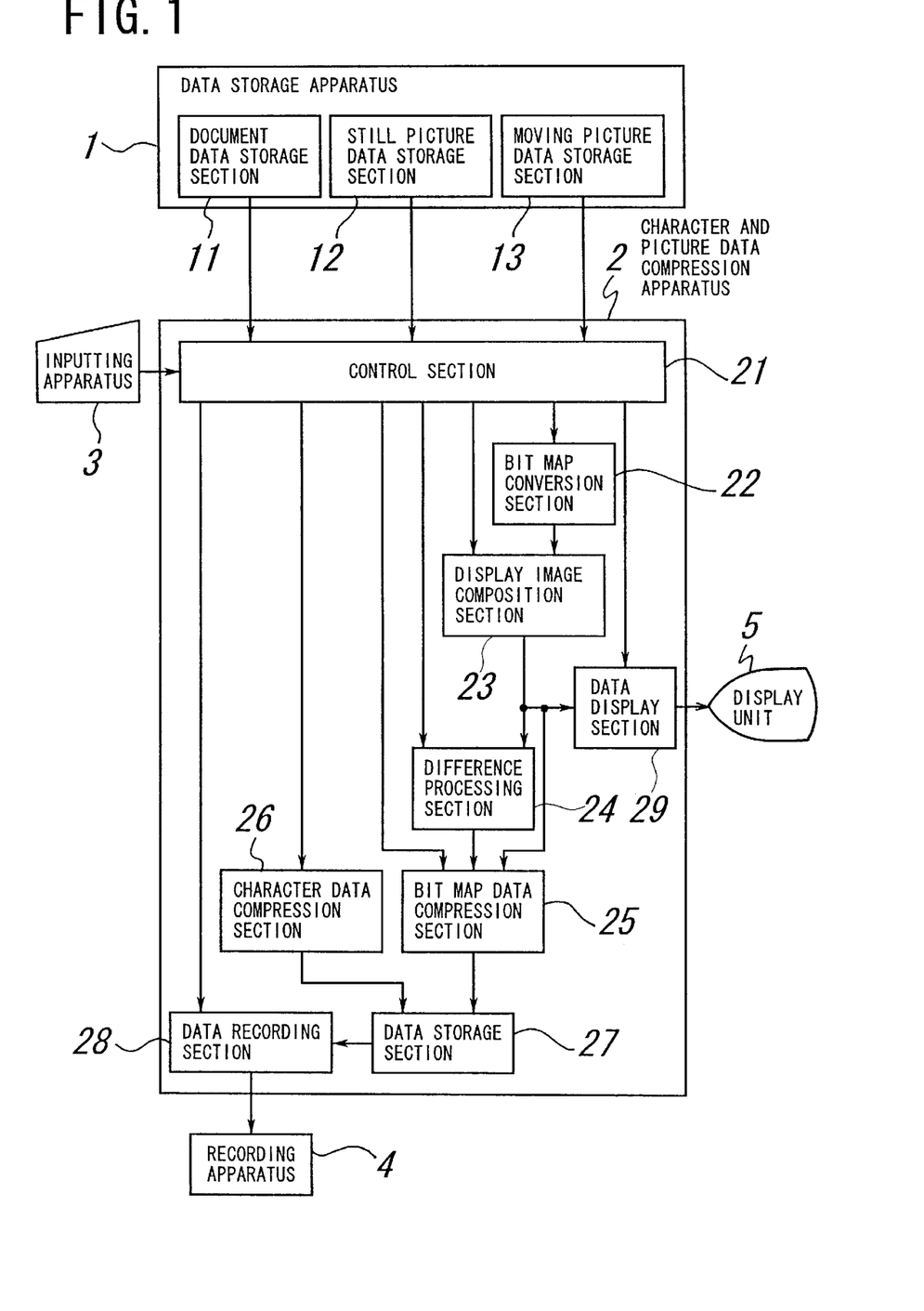
FIG. 1 is a block diagram of a character and picture data processing system in which a character and picture data compression apparatus according to the present invention is incorporated.

Referring first to FIG. 1, there is shown a character and picture data processing system in which a character and picture data compression apparatus according to the present invention is incorporated. The system shown includes a data storage apparatus 1 for storing document data, still picture data and moving picture data, a character and picture data compression apparatus 2 for compressing data stored in the data storage apparatus 1, an inputting apparatus 3 such as a keyboard, a recording apparatus 4 such as a floppy disk apparatus or a hard disk apparatus, and a display unit 5 such as a CRT or a liquid crystal display panel.

The data storage apparatus 1 includes a document data storage section 11 for storing document data of the character code form, a still picture data storage section 12 for storing still picture data of the binary bit map form, and a moving picture data storage section 13 for storing moving picture data of the binary bit map form.

The character and picture data compression apparatus 2 includes a control section 21 for controlling the entire character and picture data compression apparatus 2, a bit map conversion section 22 for converting document data of the character code form into data of the binary bit map form, a display image composition section 23 for composing document data of the bit map form from the bit map conversion section 22 and still picture data and moving picture data of the bit map form into a display image, a difference processing section 24 for calculating a difference between display images of successive pages, a bit map data compression section 25 for compressing data of the bit map form, a character data compression section 26 for compressing document data of the character code form, a data storage section 27 for temporarily storing data compressed by the compression sections 25 and 26, a data recording section 28 for recording compressed data stored in the data storage section 27 into the recording apparatus 4, and a data display section 29 for displaying a display image produced by the display image composition section 23 on the display unit 5.

Figure 2A:
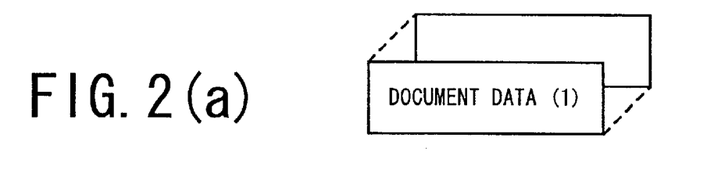
FIGS. 2(a) to 2(c) are diagrammatic views illustrating document data, still picture data and moving picture data stored in a document data storage section, a still picture data storage section and a moving picture data storage section of a data storage apparatus shown in FIG. 1.
Figure 2B:
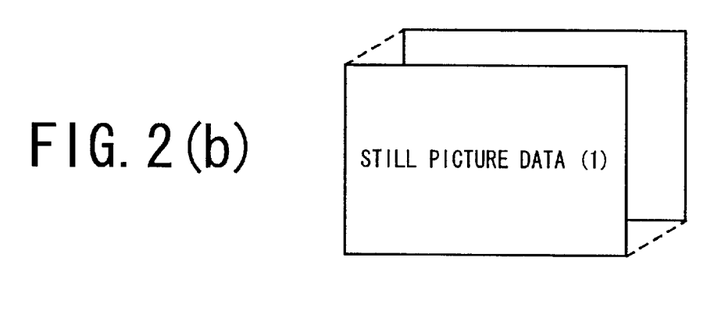
Figure 2C:
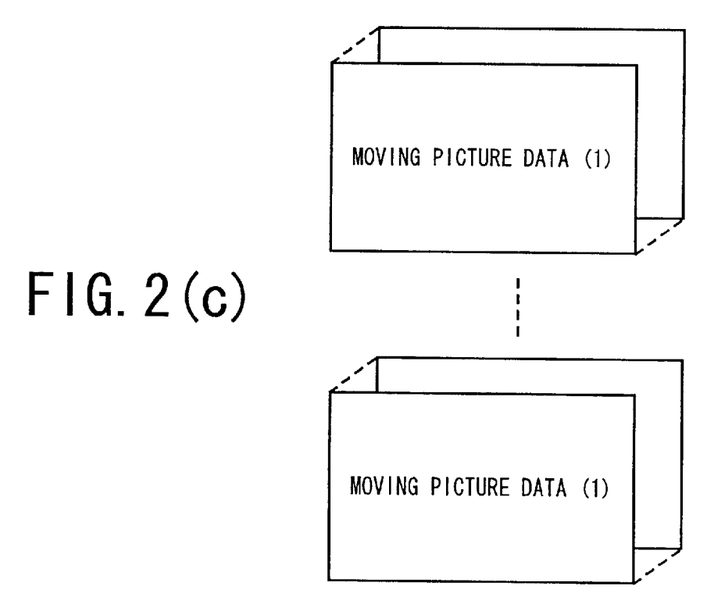

FIGS. 2(a), 2(b) and 2(c) diagrammatically illustrate document data, still picture data and moving picture data stored in the document data storage section 11, the still picture data storage section 12 and the moving picture data storage section 13 of the data storage apparatus 1. The document data storage section 11 stores a plurality of document data obtained by coding characters, symbols and so forth into 2-byte codes as seen in FIG. 2(a). Each of the document data has a unique identifier applied thereto. Meanwhile, the still picture data storage section 12 stores a plurality of still picture data of the binary bit map form as seen in FIG. 2(b). Each of the still picture data has a unique identifier applied thereto. Further, the moving picture data storage section 13 stores a plurality of moving picture data of the binary bit map form as seen in FIG. 2(c). Each of the moving picture data has a unique identifier applied thereto. Each moving picture data is formed from a plurality of frames to each of which a frame number is applied.

Figure 3:
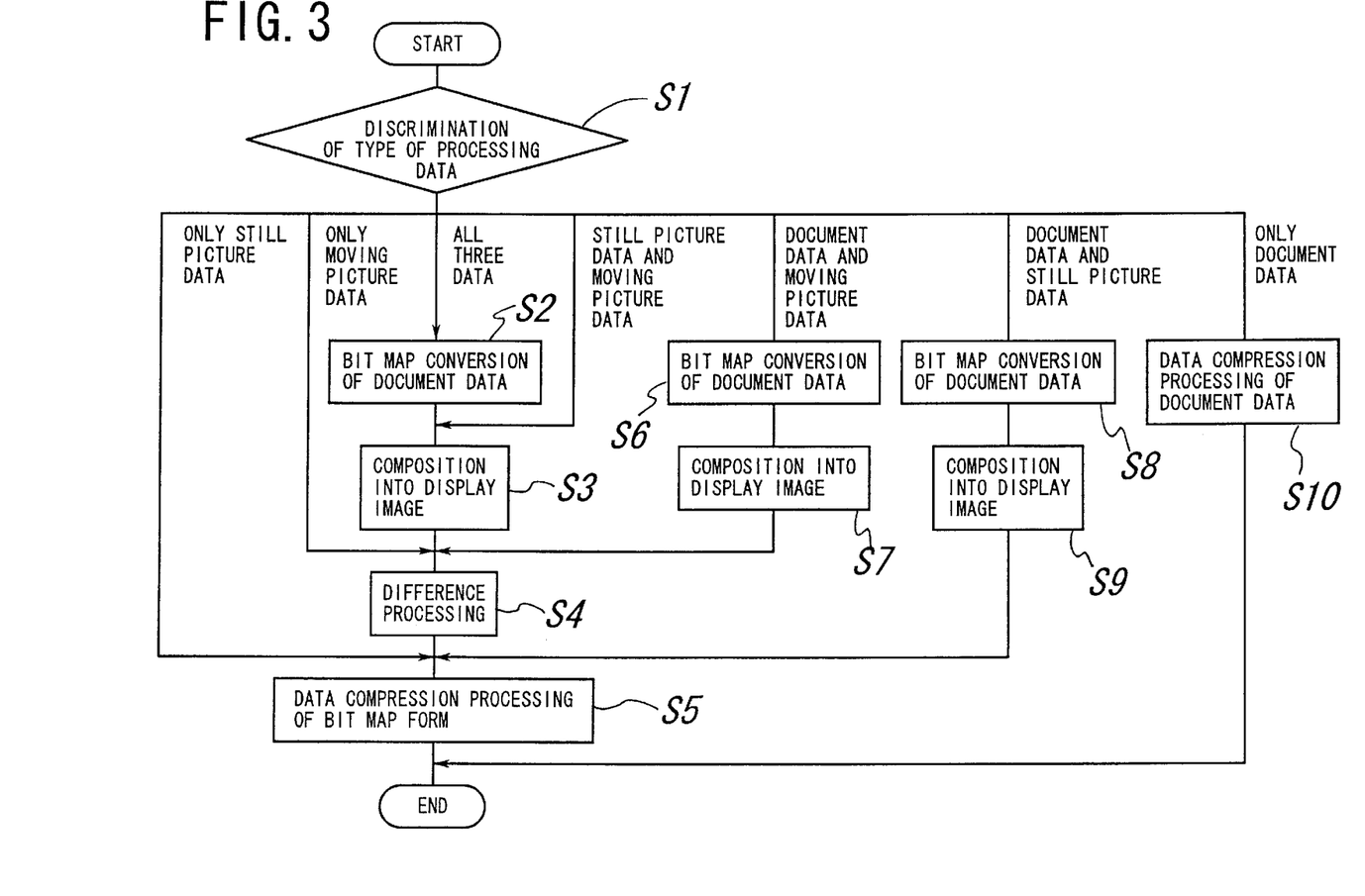
FIG. 3 is a flow chart illustrating a flow of compression processing of the character and picture data compression apparatus shown in FIG. 1.

FIG. 3 illustrates a flow of data compression processing of the character and picture data compression apparatus 2. The character and picture data compression apparatus 2 to which the present invention is applied can collectively compress an arbitrary selective combination of three different data including document data, still picture data and moving picture data stored in the data storage apparatus 1. In the following, compression processes of different combinations of the data will be described.

1) Combination of Document Data, Still Picture Data and Moving Picture Data

A user will designate identifiers of document data, still picture data and moving picture data as object data for compression using the inputting apparatus 3, designate composition positions of the individual data on a display image and designate compression processing to the character and picture data compression apparatus 2. It is to be noted that the composition positions are designated usually so that a document, a still picture and a moving picture do not overlap with each other on the display image.

The control section 21 of the character and picture data compression apparatus 2 to which compression processing is designated discriminates at step S1 that a combination of the three different data should be compressed. Thus, the control section 21 first reads in document data of the corresponding designated identifier from the document data storage section 11 and delivers the document data to the bit map conversion section 22 so that the form of the document data may be converted from the character code form to the bit map form by the bit map conversion section 22 (step S2). The bit map conversion by the bit map conversion section 22 is performed in a similar manner to bit map development which is performed when a document represented in character codes is displayed on a bit map display unit. Then, the control section 21 reads in still picture data and moving picture data having the corresponding designated identifiers from the still picture data storage section 12 and the moving picture data storage section 13, respectively, and delivers the still picture data and the moving picture data to the display image composition section 23. Then, the control section 21 instructs the display image composition section 23 to compose the still picture data and the moving picture data delivered thereto and the document data of the bit map form produced by the bit map conversion section 22 into a display image. Further, the control section 21 sends notice of the composition positions of the individual data on the display image to the display image composition section 23.

The display image composition section 23 composes the document data of the bit map form, the still picture data of the bit map form and data of the first frame of the moving picture data of the bit map form in a well positioned condition at the designated composition positions to produce a display image of the first page. Then, the display image composition section 23 replaces only the moving picture data portion of the display image of the first page thus produced with moving picture data of the second frame to produce a display image of the second page. Thus, the display image composition section 23 produces a number of display images equal to the number of frames of the moving picture data in a similar manner and transmits the thus produced display images successively to the difference processing section 24 (step S3).

The difference processing section 24 transmits, when the display images of the plurality of pages are received from the display image composition section 23, the display image of the first page as it is to the bit map data compression section 25, but transmits, for each of the display images of the succeeding pages, a difference display image of the bit map form produced by subtracting the current display image from the immediately preceding display image to the bit map data compression section 25 (step S4).

Figure 4:
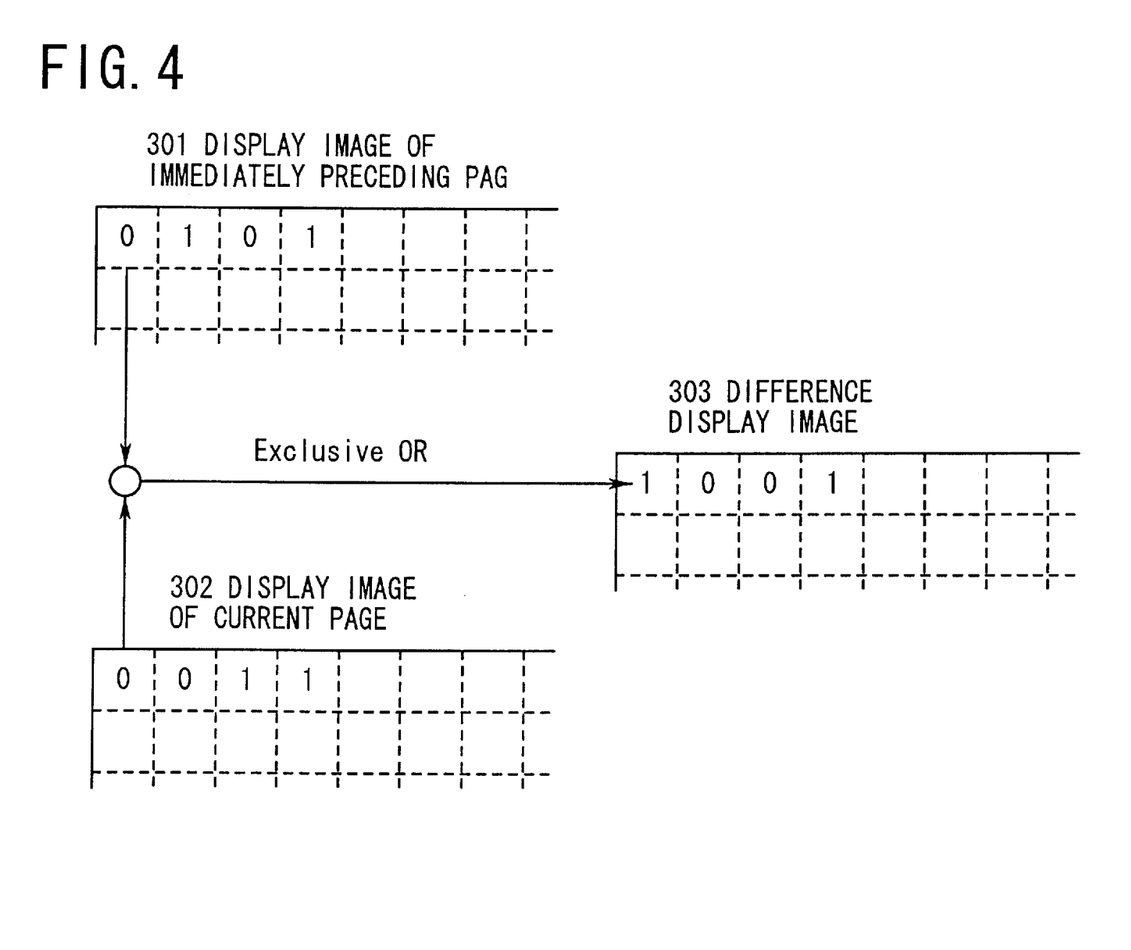
FIG. 4 is a diagrammatic view illustrating operation of a difference processing section in the character and picture data compression apparatus shown in FIG. 1.

FIG. 4 illustrates operation of the difference processing section 24. Referring to FIG. 4, reference numeral 301 denotes a display image of the immediately preceding page, and 302 denotes a display image of the current page. The same display picture elements of the display image 301 of the immediately preceding page and the display image 302 of the current page are logically exclusively ORed to produce a difference display image 303 for the display image of the current page. Here, since the contents of the document area and the still picture area of the display image are individually same among the pages of the moving picture, the picture elements in the areas of the difference display images have the value 0, and consequently, the compression rate of data compression processing which will be hereinafter described is improved as much.

Referring back to FIG. 3, when the display images of the plurality of pages are received from the difference processing section 24, the bit map data compression section 25 performs compression processing in units of one page and stores the compressed data of the individual pages into the data storage section 27 (step S5).

For the compression algorithm of the bit map data compression section 25, an arbitrary one of known algorithms can be applied. For example, slide dictionary type Lempel-Giv coding which is one of universal coding methods can be applied. Two algorithms of the slide dictionary type (also called universal type) and the dynamic dictionary type have been proposed for the Lempel-Giv coding. Of the two algorithms, the algorithm of the slide dictionary type is advantageous in that a high compression ratio can be achieved although a comparatively large amount of calculation is involved. The principle of the algorithm of the slide dictionary type is that coded data are delineated into a longest sequence (partial sequence) which coincides with a portion of a data sequence in the past which begins with an arbitrary position of the data sequence and are coded as a copy of the sequence of the past. Also the MMR system which is an international standard system for facsimile apparatus can be used. The MMR system compresses data taking notice of a connection relationship at a variation point that a displacement in boundary (variation point relative address) of a variation point (picture element at a changing point from white to black or from black to white) in a scanning line from that of the immediately preceding line is small. By such data compression, data of a character image formed from character data can be compressed to a small fraction around one tenth. Although the MPEG or the JPEG can naturally be applied, since the moving picture which is to be handled by the arrangement of the present embodiment is a simplified animation such as line drawings, simple coding such as slide dictionary type Lempel-Giv coding which involves simple compression procession or decompression processing is suitably used rather than complicated processing such as the MPEG.

2) Combination of Still Picture Data and Moving Picture Data

A user will designate identifiers of still picture data and moving picture data as object data for compression using the inputting apparatus 3, designate composition positions of the data on a display image and designate compression processing to the character and picture data compression apparatus 2. Consequently, the control section 21 discriminates at step S1 in FIG. 3 that a combination of two different data of still picture data and moving picture data should be compressed, and reads in still picture data and moving picture data having the corresponding designated identifiers from the still picture data storage section 12 and the moving picture data storage section 13, respectively. Then, the control section 21 delivers the still picture data and the moving picture data to the display image composition section 23 and instructs the display image composition section 23 to compose the still picture data and the moving picture data thus delivered into a display image. The control section 21 simultaneously notifies the composition positions of the two data on a display image.

The display image composition section 23 composes the still picture data of the bit map form and data of the first frame of the moving picture data of the bit map form both delivered thereto from the control section 21 in a well positioned condition at the respective designated composition positions to produce a display image of the first page. Then, the display image composition section 23 replaces only the moving picture data portion of the display image of the first page thus produced with moving picture data of the second frame to produce a display image of the second page. Thus, the display image composition section 23 produces a number of display images equal to the number of frames of the moving picture data in a similar manner and transmits the thus produced display images successively to the difference processing section 24 (step S3).

The difference processing section 24 transmits, when the display images of the plurality of pages are received from the display image composition section 23, the display image of the first page as it is to the bit map data compression section 25, but transmits, for each of the display images of the succeeding pages, a difference display image of the bit map form produced by subtracting the current display image from the immediately preceding display image to the bit map data compression section 25 (step S4). The bit map data compression section 25 performs compression processing of the thus received display data of the plurality of pages in units of one page and stores the compressed data of the individual pages into the data storage section 27 (step S5).

3) Combination of Document Data and Moving Picture Data

A user will designate identifiers of document data and moving picture data as object data for compression using the inputting apparatus 3, designate composition positions of the data on a display image and designate compression processing to the character and picture data compression apparatus 2. Consequently, the control section 21 discriminates at step S1 in FIG. 3 that a combination of two different data of document data and moving picture data should be compressed, and reads in document data having the corresponding designated identifier from the document data storage section 11. The control section 21 delivers the document data to the bit map conversion section 22 so that the form of the document data may be converted from the character code form to the bit map form by the bit map conversion section 22 (step S6). Then, the control section 21 reads in moving picture data having the corresponding designated identifier from the moving picture data storage section 13, and delivers the still picture data to the display image composition section 23. Further, the control section 21 instructs the display image composition section 23 to compose the moving picture data thus delivered and the document data of the bit map form produced by the bit map conversion section 22 into a display image. The control section 21 simultaneously notifies the composition positions of the two data on the display image.

The display image composition section 23 composes the document data of the bit map form and data of the first frame of the moving picture data of the bit map form both in a well positioned condition at the designated composition positions to produce a display image of the first page. Thereafter, the display image composition section 23 produces display images of the second and following pages in a similar manner and transmits the thus produced display images successively to the difference processing section 24 (step S7).

The difference processing section 24 transmits the display image of the first page received from the display image composition section 23 as it is to the bit map data compression section 25, but transmits, for each of the display images of the succeeding pages, a difference display image of the bit map form produced by subtracting the current display image from the immediately preceding display image to the bit map data compression section 25 (step S4). The bit map data compression section 25 performs compression processing of the thus received display data of the plurality of pages in units of one page and stores the compressed data of the individual pages into the data storage section 27 (step S5).

4) Combination of Document Data and Still Picture Data

A user will designate identifiers of document data and still picture data as object data for compression using the inputting apparatus 3, designate composition positions of the data on a display image and designate compression processing to the character and picture data compression apparatus 2. Consequently, the control section 21 discriminates at step S1 in FIG. 3 that a combination of two different data of document data and still picture data should be compressed, and first reads in document data having the corresponding designated identifier from the document data storage section 11. The control section 21 delivers the document data to the bit map conversion section 22 so that the form of the document data may be converted from the character code form to the bit map form by the bit map conversion section 22 (step S8). Then, the control section 21 reads in moving picture data having the corresponding designated identifier from the still picture data storage section 12, and delivers the still picture data to the display image composition section 23. Further, the control section 21 instructs the display image composition section 23 to compose the still picture data thus delivered and the document data of the bit map form produced by the bit map conversion section 22 into a display image. The control section 21 simultaneously notifies the composition positions of the two data on the display image.

The display image composition section 23 composes the document data of the bit map form and the still picture data of the bit map form both in a well positioned condition at the designated composition positions to produce a display image of the first page. Then, the display image composition section 23 transmits the display image to the bit map data compression section 25 (step S9).

When the display image for one page is received from the display image composition section 23, the bit map data compression section 25 performs compression processing of the display image and stores the thus compressed data into the data storage section 27 (step S5).

5) Only Moving Picture Data

A user will designate an identifier of moving picture data as object data for compression using the inputting apparatus 3 and designate compression processing to the character and picture data compression apparatus 2. Consequently, the control section 21 discriminates at step S1 in FIG. 3 that only moving picture data should be compressed, and first reads in moving picture data having the designated identifier from the document data storage section 11. The control section 21 delivers the document data to the difference processing section 24. When the moving picture data are received from the control section 21, the difference processing section 24 transmits the moving picture data of the first page as it is as a display image of the first page to the bit map data compression section 25, but transmits, for each of the display images of the succeeding pages, a difference display image produced by subtracting the current display image from the immediately preceding display image to the bit map data compression section 25 (step S4). The bit map data compression section 25 performs data compression processing of the thus received display data of the plurality of pages in units of one page and stores the compressed data of the individual pages into the data storage section 27 (step S5).

6) Only Still Picture Data

A user will designate an identifier of still picture data as object data for compression using the inputting apparatus 3 and designate compression processing to the character and picture data compression apparatus 2. Consequently, the control section 21 discriminates at step S1 in FIG. 3 that only still picture data should be compressed, and first reads in still picture data having the designated identifier from the still picture data storage section 12. The control section 21 delivers the still picture data to the bit map data compression section 25. When the still picture data are received from the control section 21, the bit map data compression section 25 performs data compression processing of the thus received still picture data and stores the compressed data into the data storage section 27 (step S5).

7) Only Document Data

A user will designate an identifier of document data as object data for compression using the inputting apparatus 3 and designate compression processing to the character and picture data compression apparatus 2. Consequently, the control section 21 discriminates at step S1 in FIG. 3 that only document data should be compressed, and reads in document data having the designated identifier from the document data storage section 11. The control section 21 delivers the document data to the character data compression section 26 while the character code form is maintained without changing the form of the document data into the bit map form. The character data compression section 26 performs data compression processing of the document data received from the control section 21 using a known algorithm as a compression algorithm of character codes and stores the compressed data into the data storage section 27 (step S10). It is to be noted that, in the present embodiment, when only document data should be compressed, they are compressed while they remain in the character code form. The reason why document data are compressed in this manner is that it is intended to assure a high compression ratio by using, where only document data should be compressed, a data compression algorithm suitable for such compression. However, document data may be compressed by the bit map data compression section 25 after the form of it is converted into the bit map form.

By the processing described above, an arbitrary selective combination of document data, still picture data and moving picture data stored in the data storage apparatus 1 can be compressed collectively. The data compressed and stored in the data storage section 27 in this manner are recorded from the data storage section 27 into the recording apparatus 4 by the data recording section 28 which is activated in response to an instruction from the inputting apparatus 3.

It is to be noted that, in the character and picture data compression apparatus 2 of the embodiment described above, display image data produced by the display image composition section 23 are inputted also to the data display section 29, and since the data display section 29 causes the display unit 5 to display the display image, the display image in the composed condition can be visually confirmed by the user. It is to be noted that it can be designated by an instruction from the inputting apparatus 3 whether or not the monitor display should be effective, and the on/off operation of the data display section 29 is controlled by the control section 21. Further, the data display section 29 may otherwise have an additional function of converting the character code form into the bit map form so that contents of document data transmitted from the control section 21 to the data display section 29 may be displayed on the display unit 5.

Figure 5:
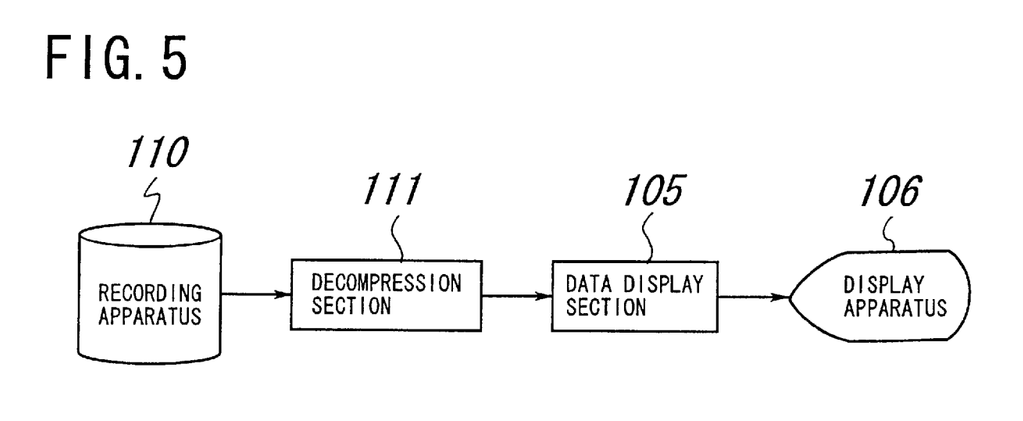
FIG. 5 is a block diagram showing an exemplary construction of a system which displays a display image including a document, a still picture and a moving picture using compressed data produced by the character and picture data compression apparatus of the present invention.

FIG. 5 shows an exemplary construction of a system which displays a display image, in which a document, a still picture and a moving picture are included in a mixed condition, using compressed data recorded into the recording apparatus 4 in such a manner as described above. Referring to FIG. 5, compressed data recorded in the recording apparatus 4 of FIG. 1 are recorded in a recording apparatus 110, and when the compressed data are to be displayed, a decompression section 111 decompresses the compressed data recorded in the recording apparatus 110. In this instance, when the compressed data are for one page, only a display image obtained by decompression of the compressed data is displayed on a display apparatus 106 through a data display section 105. On the other hand, when the compressed data are for a plurality of pages, decompression processing is performed for each page. In this instance, the display image of the first page is displayed as it is, but the display images of the succeeding pages are displayed after they are restored each using the display image of the immediately preceding page and the difference display image of the relevant page obtained by decompression. With the system described above, characters, a still picture and a moving picture need not be decompressed independently of each other different from the system described hereinabove with reference to FIG. 7. Further, also the processing for composing display images is eliminated, and consequently, high speed displaying can be realized. Naturally, the capacity required for the recording apparatus 110 can be reduced since a display image itself is recorded in a compressed condition.

It is to be noted that the application of the character and picture data compression apparatus of the present embodiment is not limited to production of compressed data to be recorded into the recording apparatus 110 of such a system as shown in FIG. 5. In particular, the character and picture data compression apparatus can be applied to storage of document data of the character code form and still picture data and/or moving picture data of the bit map form in a correlated condition, transmission of such data to another location over a communication path and so forth. Further, while still picture data and moving picture data of the binary bit map form are used in the present embodiment, still picture data and moving picture data of the multiple value bit map form can be used similarly.

Having now fully described the invention, it will be apparent to one of ordinary skill in the art that many changes and modifications can be made thereto without departing from the spirit and scope of the invention as set forth herein.

What is claimed is:

1. A character and picture data compression apparatus for collectively compressing document data of a character code form and picture data of a bit map form, comprising:

conversion means for converting the document data into document data of the bit map form;

display image composition means for composing the document data of the bit map form from said conversion means and the picture data of the bit map form into a display image; and data compression means for compressing the display image of the bit map form produced by said display image composition means.

2. A character and picture data compression apparatus for collectively compressing document data of a character code form and picture data of a bit map form, comprising:

conversion means for converting the document data into document data of the bit map form;

display image composition means for composing the document data of the bit map form from said conversion means and the picture data of the bit map form into a display image;

difference processing means for calculating a difference between a plurality of display images of the bit map form produced by said display image composition means; and data compression means for compressing the display image from said difference processing means.

3. A character and picture data compression apparatus for collectively compressing document data of a character code form, still picture data of a bit map form and moving picture data of the bit map form for a plurality of frames, comprising:

conversion means for converting the document data into document data of the bit map form;

display image composition means for composing the document data of the bit map form from said conversion means, the still picture data of the bit map form and the moving picture data of the bit map form into display images for a plurality of pages;

difference processing means for calculating, for each of the display images of second and following pages produced by said display image composition means, a difference of the bit map form of the display image from an immediately preceding display image; and data compression means for successively receiving the display image of a first page produced by said display image composition means and the difference display images of the second and following pages obtained by said difference processing means and compressing the data of the images in units of one page.

4. A character and picture data compression apparatus as claimed in claim 3, wherein said difference processing means calculates each of the difference display images by logical exclusive ORing of same picture elements of the second and following pages and the immediately preceding page.

5. A character and picture data compression apparatus as claimed in claim 3, wherein said display image composition means composes said display images of said second and following pages by replacing only said moving picture data portion of said first page with said moving picture data of said second and following display images.

* * * * *